United States Patent [19]

Ersfeld

[11] 4,368,847
[45] Jan. 18, 1983

[54] INJECTION NOZZLE FOR MIXHEADS

[75] Inventor: Heinrich Ersfeld, Leverkusen, Fed. Rep. of Germany

[73] Assignee: Bayer Aktiengesellschaft, Leverkusen, Fed. Rep. of Germany

[21] Appl. No.: 259,872

[22] Filed: May 4, 1981

[30] Foreign Application Priority Data

May 14, 1980 [DE] Fed. Rep. of Germany ....... 3018381

[51] Int. Cl.³ .................................................. B05B 9/00
[52] U.S. Cl. .................................. 239/125; 137/627.5; 425/566
[58] Field of Search .......................... 239/124, 125, 91; 137/627.5; 425/DIG. 224, 564–566

[56] References Cited

U.S. PATENT DOCUMENTS

| | | | |
|---|---|---|---|
| 3,926,219 | 12/1975 | Ersfeld et al. | 137/625.49 |
| 4,134,428 | 1/1979 | Björklund | 239/124 X |
| 4,258,883 | 3/1981 | Hofmann et al. | 239/124 |
| 4,280,659 | 7/1981 | Gaal et al. | 239/124 |

Primary Examiner—John J. Love
Assistant Examiner—Paul A. Sobel
Attorney, Agent, or Firm—Gene Harsh; Joseph C. Gil

[57] ABSTRACT

The instant invention is directed to an injection nozzle for mixheads for the production of foams or solids from at least two flowable reaction components, comprising a nozzle housing with a nozzle needle guided in it which is provided with a positive control and cooperates with a nozzle opening, wherein a feed pipe and a return pipe end upstream of the nozzle opening in said nozzle housing and wherein said nozzle needle in its closed position connects said feed pipe and said return pipe to each other via a connecting channel, characterized in that said nozzle needle is divided into a needle core and a needle sleeve which surrounds said needle core and is guided on it, wherein said needle core cooperates with said nozzle opening and is pin-less in design and wherein said needle sleeve is provided with said connecting channel; and in that, when switching over from injection to return, said needle core is located in the closed position sooner than said needle sleeve in the return position, and when switching over from return to injection, said needle sleeve adopts the interruption position before said needle core occupies the open position.

2 Claims, 3 Drawing Figures

INJECTION NOZZLE FOR MIXHEADS

BACKGROUND OF THE INVENTION

An injection nozzle is described in U.S. Pat. No. 3,926,219. However, it has the disadvantage that the pin of the nozzle needle cannot be produced with a diameter of less than 0.8 mm for reasons of production technology. The use of a nozzle with a pin has been considered necessary in order to avoid "split conveyance." The term "split conveyance" means that the component which is supplied in a metered fashion is simultaneously conveyed partially into the mixing chamber and partially into the return pipe. The ratio of the conveying streams therefore becomes uncontrollable and perfect mixing cannot be achieved.

As there is a trend towards mixheads for the production of small parts, smaller nozzle openings must be used in order to reduce the throughputs.

The object to be achieved is to find an injection nozzle whose nozzle opening can be substantially smaller in design than hitherto but which ensures that the conveyed component is either supplied completely to the mixing chamber or passes completely into the return.

A BRIEF DESCRIPTION OF THE DRAWINGS

DESCRIPTION OF THE INVENTION

Figure 1:
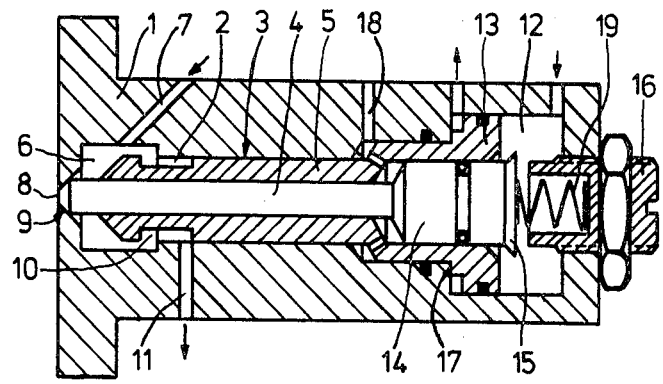
FIG. 1 shows the injection nozzle in the return position.

The instant invention is directed to an injection nozzle for mixheads for the production of foams or solids from at least two flowable reaction components comprising a nozzle housing with a nozzle needle guided in it which is provided with a positive control and cooperates with a nozzle opening, wherein a feed pipe and a return pipe end upstream of the nozzle opening in said nozzle housing and wherein said nozzle needle in its closed position connects said feed pipe and said return pipe to each other via a connecting channel characterized in that said nozzle needle is divided into a needle core and a needle sleeve which surrounds said needle core and is guided on it, wherein said needle core cooperates with said nozzle opening and is pin-less in design and wherein said needle sleeve is provided with said connecting channel; and in that, when switching over from injection to return, said needle core is located in the closed position sooner than said needle sleeve in the return position, and when switching over from return to injection, said needle sleeve adopts the interruption position before said needle core occupies the open position.

This enables the pin to be dispensed with in order to avoid "split conveyance" since the functions of opening and closing nozzle opening are allocated to the needle core and the functions of releasing and interrupting the return to the needle sleeve.

Suitable methods of positive control include mechanical, pneumatic, electromagnetic and in particular hydraulic methods.

In a preferred embodiment, the needle sleeve has a first hydraulic piston which can be charged at both ends, is guided in a hydraulic chamber in the nozzle housing and in which there is centrally guided a second hydraulic piston which can be charged at one end, is connected to the needle core and has a driver attachment cooperating with the first hydraulic piston of the needle sleeve.

This design allows reliable operation since both pistons are charged in order to close the nozzle opening at a pressure which is higher than the effective counterpressure of the component. The needle core moves into the closed position and the needle sleeve is displaced towards the nozzle opening until it rests on a housing stop, and in this position, connects the feed pipe via the connecting channel to the outlet pipe. If the apparatus is to be switched to "mix," i.e. the nozzle opening freed, the hydraulic chamber is relieved of pressure and the hydraulic piston of the needle sleeve loaded in the opposite direction so that the needle sleeve travels back and, in so doing, interrupts the return until it finally strikes against the driving attachment on the piston of the needle core and entrains the needle core so that the nozzle opening is cleared.

The new injection nozzle is shown purely schematically in section in the drawings.

A two-part needle nozzle 3 consisting of a needle core 4 and a needle sleeve 5 guided concentrically on it, is guided in a housing bore 2 in a nozzle housing 1. The housing bore 2 widens into an annular groove 6 into which another housing bore 7 merges, the annular groove 6 and the housing bore 7 representing the feed pipe for the component. The annular groove 6 merges into a nozzle opening 8 which, in FIG. 1, is sealed by the pin-less needle core 4 resting on the nozzle seat 9. The needle sleeve 5 has a connecting channel 10 designed as an annular groove. A housing bore acting as a return pipe 11 leads from the housing 1. A hydraulic chamber 12, in which a hydraulic piston 13 connected to the needle sleeve 5 is guided, is provided inside the housing. The hydraulic piston 13 is hollow in design. It acts as a guide for the hydraulic piston 14 of the needle core 4. The hydraulic piston 14 has a driver attachment 15 against which the hydraulic piston 13 can abut. The stroke width of the needle core 4 can be adjusted by means of an adjusting screw 16. The advance width of the needle sleeve 5 towards the nozzle opening 8 is limited by a housing stop 17 against which the hydraulic piston 13 can abut. Finally, a discharge bore 18 is also provided for leakages. A restoring spring 19 serves merely to keep the nozzle opening 8 closed by means of the needle core 4 when the hydraulic control is relieved of pressure.

The nozzle functions in the following manner:

In FIG. 1, the hydraulic chamber 12 is charged with pressure in such a way that the hydraulic piston 14 presses the needle core 4 onto the nozzle seat 9 so that the nozzle opening 8 is sealed. In this position, the needle sleeve 5 also rests against the housing stop 17 so that the connecting channel 10 connects the feed pipe consisting of annular groove 6 and housing bore 7 to the return pipe 11.

Figure 2:
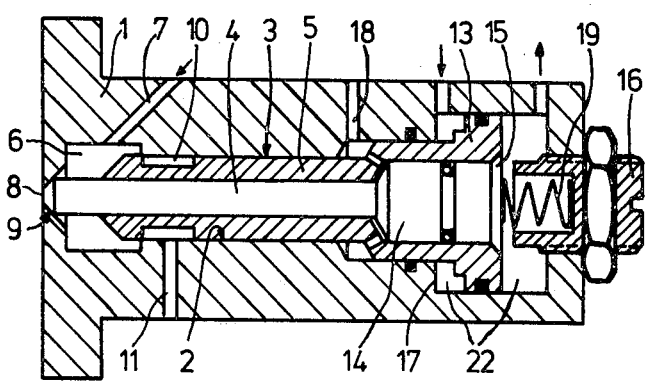
FIG. 2 shows the injection nozzle at the moment of switching over.

If the injection nozzle is switched over to "mix," the needle core 4 and the needle sleeve 5 soon adopt the position shown in FIG. 2. This is effected by charging the hydraulic chamber 12 in the direction which will push the needle sleeve 5 backwards. The connecting channel 10 is thus moved back into the housing bore 2 and interrupts the connection between feed pipe 6, 7 and return pipe 11.

Figure 3:
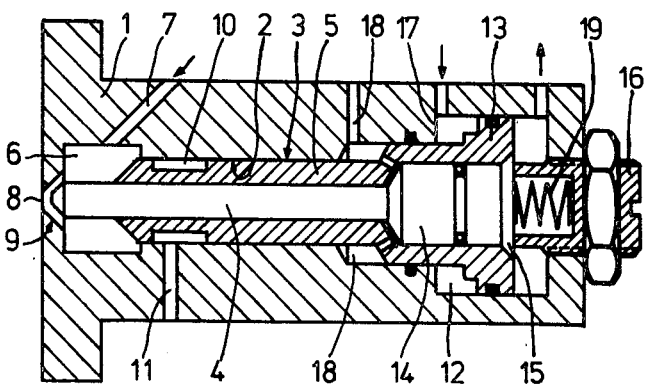
FIG. 3 shows the injection nozzle in the mixing position.

As the needle sleeve 5 moves backwards, its piston 13 strikes against the driver attachment 15 of the piston 14 so that the needle core 4 connected to it is raised from the nozzle seat 9 and clears the nozzle opening 8. The component can now flow into the mixing chamber. This position is shown in FIG. 3.

What is claimed is:

1. An injection nozzle for mixheads for the production of foams or solids from at least two flowable reaction components comprising a nozzle housing with a nozzle needle guided in it which is provided with a positive control and cooperates with a nozzle opening, wherein a feed pipe and a return pipe end upstream of the nozzle opening in said nozzle housing and wherein said nozzle needle in its closed position connects said feed pipe and said return pipe to each other via a connecting channel, characterized in that said nozzle needle is divided into a needle core and a needle sleeve which surrounds said needle core and is guided on it, wherein said needle core cooperates with said nozzle opening and is pin-less in design and wherein said needle sleeve is provided with said connecting channel; and in that, when switching over from injection to return, said needle core is located in the closed position sooner than said needle sleeve in the return position, and when switching over from return to injection said needle sleeve adopts the interruption position before said needle core occupies the open position.

2. The injection nozzle of claim 1, wherein said needle sleeve has a first hydraulic piston which can be charged at both ends, is guided in a hydraulic chamber in said nozzle housing and in which a second hydraulic piston which is connected to said needle core can be charged at one end and has a driver attachment cooperating with said first hydraulic piston of said needle sleeve and is centrally guided.

* * * * *